United States Patent
Koudouridis et al.

(10) Patent No.: US 11,109,195 B2
(45) Date of Patent: Aug. 31, 2021

(54) RADIO SYSTEM WITH UPLINK BEACON TRANSMISSION

(71) Applicant: HUAWEI TECHNOLOGIES CO., LTD., Shenzhen (CN)

(72) Inventors: George Koudouridis, Kista (SE); Henrik Lundqvist, Kista (SE); Xavier Gelabert, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 16/582,972

(22) Filed: Sep. 25, 2019

(65) Prior Publication Data
US 2020/0021952 A1   Jan. 16, 2020

Related U.S. Application Data

(63) Continuation of application No. PCT/EP2017/057750, filed on Mar. 31, 2017.

(51) Int. Cl.
*H04W 4/08* (2009.01)
*H04W 72/08* (2009.01)
*H04W 72/12* (2009.01)

(52) U.S. Cl.
CPC .......... *H04W 4/08* (2013.01); *H04W 72/085* (2013.01); *H04W 72/121* (2013.01)

(58) Field of Classification Search
CPC ... H04W 4/08; H04W 72/085; H04W 72/121; H04W 84/20
See application file for complete search history.

(56) References Cited

U.S. PATENT DOCUMENTS 7,830,838 B2 * 11/2010 Kohvakka ............... H04L 67/12
                                                         370/330
7,848,278 B2 * 12/2010 Chen ..................... H04B 7/2606
                                                         370/328
(Continued)

FOREIGN PATENT DOCUMENTS

BR   112015010627 A2 *  7/2017  ............ H04W 24/10
CN    102970761 A       3/2013
(Continued)

OTHER PUBLICATIONS

Bao et al., Efficient clustering V2V routing based on PSO in VANETs, Nov. 26, 2019, Measurement, vol. 152, DOI: 10.1016/j.measurement.2019.107306 (Year: 2019).*

(Continued)

*Primary Examiner* — Eric Nowlin
(74) *Attorney, Agent, or Firm* — Stein IP, LLC

(57) ABSTRACT

The invention relates to devices in a wireless network transmitting uplink beacons such as a network node comprising a transceiver for communication with at least one User Equipment, UE. The network node is configured to receive an at least one uplink beacon corresponding to the at least one UE, and to determine a group comprising at least a first UE and a second UE, based on received uplink beacons from the first UE and the second UE. The network node is also configured to determine uplink beacon reconfiguration for each UE in the group, comprising information specifying a group uplink beacon, and information specifying a UE configuration for the UEs of the group, indicating each UE of the group either as being a UE for sending said group uplink beacon, or as a UE for receiving said group uplink beacon.

19 Claims, 7 Drawing Sheets

(56) References Cited

U.S. PATENT DOCUMENTS

| | | | | |
|---|---|---|---|---|
| 8,351,417 | B2* | 1/2013 | Chen | H04L 45/20 370/351 |
| 8,352,112 | B2* | 1/2013 | Mudalige | G08G 1/164 701/24 |
| 8,725,395 | B2* | 5/2014 | Fukuyama | H04W 40/32 701/117 |
| 9,020,417 | B2* | 4/2015 | So | H04B 7/15592 455/7 |
| 9,253,021 | B2* | 2/2016 | Vasseur | H04L 41/0896 |
| 9,412,271 | B2* | 8/2016 | Sharma | G08G 1/07 |
| 9,578,635 | B2* | 2/2017 | Vannithamby | H04L 5/0073 |
| 9,819,750 | B2* | 11/2017 | Raissinia | H04L 67/16 |
| 9,843,898 | B1* | 12/2017 | Greenberger | H04B 17/318 |
| 9,906,924 | B2* | 2/2018 | Azmat | H04W 76/40 |
| 9,984,570 | B2* | 5/2018 | Yao | H04W 4/80 |
| 10,056,952 | B2* | 8/2018 | Ghosh | H04W 74/04 |
| 10,390,378 | B2* | 8/2019 | Fodor | H04W 84/20 |
| 10,440,668 | B1* | 10/2019 | Wu | G08G 1/22 |
| 10,524,196 | B2* | 12/2019 | Gelabert | H04W 36/30 |
| 10,530,622 | B2* | 1/2020 | Zarifi | H04L 5/0048 |
| 10,638,478 | B2* | 4/2020 | Nikopour | H04W 72/0453 |
| 10,645,750 | B2* | 5/2020 | Tenny | H04W 72/14 |
| 10,880,936 | B2* | 12/2020 | Fodor | H04W 84/20 |
| 2005/0239405 | A1* | 10/2005 | Myyry | H04W 4/08 455/41.2 |
| 2008/0062945 | A1* | 3/2008 | Ahuja | H04W 8/005 370/342 |
| 2008/0247353 | A1* | 10/2008 | Pun | H04L 45/46 370/328 |
| 2009/0280797 | A1* | 11/2009 | So | H04B 7/2606 455/422.1 |
| 2010/0290378 | A1* | 11/2010 | Wu | H04W 52/0216 370/311 |
| 2013/0227114 | A1* | 8/2013 | Vasseur | H04L 41/044 709/224 |
| 2014/0092833 | A1* | 4/2014 | Vannithamby | H04L 5/0035 370/329 |
| 2014/0201280 | A1* | 7/2014 | Qi | H04W 84/20 709/204 |
| 2015/0043541 | A1* | 2/2015 | Blankenship | H04W 72/02 370/336 |
| 2015/0124681 | A1* | 5/2015 | Zhou | H04M 3/567 370/312 |
| 2015/0249914 | A1* | 9/2015 | Yu | H04W 8/005 370/328 |
| 2015/0289276 | A1* | 10/2015 | Goussard | H04W 84/12 370/252 |
| 2015/0332248 | A1* | 11/2015 | Weksler | H04W 40/244 705/71 |
| 2015/0350027 | A1* | 12/2015 | Raissinia | H04W 56/0015 455/517 |
| 2015/0358403 | A1* | 12/2015 | Bodstrom | H04L 67/1051 709/209 |
| 2016/0128053 | A1* | 5/2016 | Wei | H04W 72/048 455/450 |
| 2016/0143077 | A1* | 5/2016 | Fodor | H04W 72/082 370/329 |
| 2017/0006616 | A1* | 1/2017 | Singh | H04W 74/0808 |
| 2017/0289864 | A1* | 10/2017 | Narasimha | H04W 36/0027 |
| 2017/0293296 | A1* | 10/2017 | Stenneth | G06Q 20/10 |
| 2018/0041950 | A1* | 2/2018 | Gelabert | H04W 36/305 |
| 2018/0049268 | A1* | 2/2018 | Tenny | H04W 72/14 |
| 2018/0123850 | A1* | 5/2018 | Zarifi | H04J 13/0062 |
| 2018/0146471 | A1* | 5/2018 | Xu | H04L 67/12 |
| 2018/0213412 | A1* | 7/2018 | Makati | H04W 16/26 |
| 2019/0035284 | A1* | 1/2019 | Tam | G05D 1/0297 |
| 2019/0251848 | A1* | 8/2019 | Sivanesan | H04L 5/0048 |
| 2019/0373655 | A1* | 12/2019 | Fodor | H04W 56/001 |
| 2020/0003861 | A1* | 1/2020 | Eriksson | B60R 21/0134 |
| 2020/0015168 | A1* | 1/2020 | Kamei | H04B 17/318 |
| 2020/0021952 | A1* | 1/2020 | Koudouridis | H04W 48/16 |
| 2020/0064140 | A1* | 2/2020 | Tarkiainen | G08G 1/087 |
| 2020/0084712 | A1* | 3/2020 | Wu | H04B 7/0608 |
| 2020/0092151 | A1* | 3/2020 | Zarifi | H04J 13/0062 |
| 2020/0092685 | A1* | 3/2020 | Fehrenbach | H04B 7/2606 |
| 2020/0120458 | A1* | 4/2020 | Aldana | H04W 36/08 |
| 2020/0267519 | A1* | 8/2020 | Reimann | G08G 1/096791 |
| 2020/0313827 | A1* | 10/2020 | Noh | H04L 5/0057 |

FOREIGN PATENT DOCUMENTS

| | | | | |
|---|---|---|---|---|
| CN | 103327627 | A | | 9/2013 |
| CN | 104756436 | A | | 7/2015 |
| CN | 104982076 | A * | 10/2015 | H04W 72/0473 |
| CN | 107534918 | A * | 1/2018 | H04W 24/10 |
| CN | 109952797 | A * | 6/2019 | H04W 72/1278 |
| CN | 110476473 | A * | 11/2019 | H04W 72/121 |
| CN | 107534918 | B * | 3/2020 | H04W 48/20 |
| CN | 111132257 | A * | 5/2020 | |
| CN | 111163438 | A * | 5/2020 | G08G 1/22 |
| DE | 102019129702 | A1 * | 5/2020 | H04W 4/44 |
| EP | 2733998 | A1 * | 5/2014 | H04W 52/267 |
| EP | 2744290 | A1 | 6/2014 | |
| EP | 2921006 | A1 * | 9/2015 | H04W 24/10 |
| EP | 2999272 | A1 * | 3/2016 | H04W 48/20 |
| EP | 3014927 | A1 * | 5/2016 | H04W 16/28 |
| EP | 3014927 | A4 * | 6/2017 | H04L 45/46 |
| EP | 3091522 | A4 * | 9/2017 | H04W 4/029 |
| EP | 3253126 | A1 * | 12/2017 | H04W 40/24 |
| EP | 3278596 | A1 * | 2/2018 | H04W 24/10 |
| EP | 2999272 | B1 * | 6/2018 | H04W 48/04 |
| EP | 3491870 | A1 * | 6/2019 | H04W 48/10 |
| EP | 3491870 | A4 * | 6/2019 | H04W 76/28 |
| EP | 3278596 | B1 * | 8/2019 | H04W 72/1231 |
| EP | 3672357 | A1 * | 6/2020 | H04W 84/18 |
| EP | 3253126 | B1 * | 7/2020 | H04W 40/24 |
| EP | 3014927 | B1 * | 8/2020 | H04W 56/001 |
| EP | 3742810 | A1 * | 11/2020 | H04W 40/32 |
| GB | 2552029 | A * | 1/2018 | H04W 40/22 |
| GB | 2554135 | A * | 3/2018 | H04W 4/46 |
| JP | 6275005 | B2 * | 2/2018 | H04W 48/20 |
| KR | 20150094600 | A * | 8/2015 | H04W 24/10 |
| KR | 101660012 | B1 * | 9/2016 | |
| WO | 2008077951 | A1 | 7/2008 | |
| WO | WO-2010103504 | A1 * | 9/2010 | G08G 1/08 |
| WO | WO-2014072849 | A1 * | 5/2014 | H04W 40/20 |
| WO | WO-2014076534 | A1 * | 5/2014 | H04W 52/267 |
| WO | 2014124689 | A1 | 8/2014 | |
| WO | WO-2014205692 | A1 * | 12/2014 | H04W 68/005 |
| WO | 2016146147 | A1 | 9/2016 | |
| WO | 2016198095 | A1 | 12/2016 | |
| WO | WO-2016192815 | A1 * | 12/2016 | H04W 72/1231 |
| WO | WQ-2016198095 | A1 * | 12/2016 | H04L 5/0048 |
| WO | WO-2018035145 | A1 * | 2/2018 | B60W 50/0097 |
| WO | WQ-2018033072 | A1 * | 2/2018 | H04W 52/0216 |
| WO | WO-2018177548 | A1 * | 10/2018 | H04W 72/121 |

OTHER PUBLICATIONS

Liu et al., A joint Control-Communication design for reliable vehicle platooning in hybrid traffic. IEEE Transactions on Vehicular Technology, 66(10), 9394-9409. doi:http://dx.doi.org/10.1109/TVT.2017.2702650 (Year: 2017).*

P. Kela et al. "A Novel Radio Frame Structure for 5G Dense Outdoor Radio Access Networks", accepted at IEEE 81st Vehicular Technology Conference (VTC2015-Spring), May 2015, total 6 pages.

X. Gelabert et al."Mobility Performance and Suitability of Macro Cell Power-Off in LTE Dense Small Cell HetNets," in IEEE 18th Int. Workshop on Computer Aided Modeling Analysis and Design of Commun. Links and Networks (CAMAD 2013), Sep. 2013. pp. 99-103.

D. Lopez-Perez, I. Guvenc, and X. Chu, "Mobility management challenges in 3GPP heterogeneous networks," IEEE Commun. Mag., vol. 50, No. 12, pp. 70-78, 2012.

* cited by examiner

RADIO SYSTEM WITH UPLINK BEACON TRANSMISSION

CROSS-REFERENCE TO RELATED APPLICATIONS

This application is a continuation of International Application No. PCT/EP2017/057750, filed on Mar. 31, 2017, the disclosure of which is hereby incorporated by reference in its entirety.

TECHNICAL FIELD

The invention relates to devices for use in a wireless communication system. In particular, the invention relates to efficient transmission of uplink beacons in radio system.

BACKGROUND

In a radio telecommunication systems network, the network is configured to connect User Equipments (UEs) to the network. Hereby a User Equipment is enabled to communicate via the network. The trend today is to provide very dense networks with short distances between the different network nodes that the User Equipment can connect via. Thus, it can be shown that the increased data traffic demands and the short latencies required by next generation wireless standards are effectively addressed by serving mobile users in an ultra-dense networks (UDN). UDN and network densification is expected to provide a quantitatively better solution for beyond 4G networks as compared with micro cell deployments equipped with for example massive Multiple Input Multiple Output (M-MIMO) technology. For the realization of an UDN, a dense deployment of low-power access nodes (ANs) mounted on streetlamp poles, lampposts and traffic signs may be envisaged.

In such a dense scenario, measurement of downlink reference signals by the User Equipment (UE) from a multiplicity of network nodes that can be termed access nodes (AN) and the transmission of measurement reports back to the network side can be expected to cause degradation in the user mobility. Therefore, it has been proposed that the UEs transmit uplink (UL) reference signals, termed UL beacons herein, which are then measured at the network side, possibly by more than one AN.

The requirements on the beacon frequency can typically depend on UE-specific features such as its speed, its location relative to the location of the network infrastructure, the network density, the UE (user) density and possibly others. The faster the UEs move in an area the more frequent the UL beacons can be transmitted. Also, the higher the AN density is, the more frequent the UL beaconing frequency can be. Lastly, the resources in terms of signature (code) sequences used to differentiate UL beacons from different UEs, constitute another issue to be taken into consideration. A longer sequence code improves channel estimation, whilst a short code sequence allows for more UEs UL beacons. Thus, a longer code requires more frequency resources. More frequency resources per beacon results to either less frequent beacons per UE or less UEs with the same beacon interval.

In addition, providing continuous UDN coverage and seamless mobility requires a monitoring of the UEs and predictions of their mobility.

There is a constant desire to improve the performance of wireless communication systems. Hence, there is a need for an improved wireless communication system, in particular a wireless communication system making use of uplink beacons.

SUMMARY

It is an object of the present invention to provide an improved wireless communication system. In particular, it is an object of the present invention to provide an improved wireless communication system making use of uplink beacons.

In accordance with a first aspect of the invention, a network node comprising a transceiver for communication with at least one User Equipment, UE, is provided. The network node being configured to receive an at least one uplink beacon corresponding to the at least one UE, and to determine a group comprising at least a first UE and a second UE, based on received uplink beacons from the first UE and the second UE. The network node is also configured to determine uplink beacon reconfiguration for each UE in the group, comprising information specifying a group uplink beacon, and information specifying a UE configuration for the UEs of the group, indicating each UE of the group either as being a UE for sending said group uplink beacon, or as a UE for receiving said group uplink beacon.

Hereby the network node is enabled to group UEs moving together and to allow the UEs to use fewer uplink beacons transmitted towards the network. This in turn will reduce the number of uplink beacons and also the radio resources used for transmitting uplink beacons from UEs moving together.

In accordance with a first implementation of the first aspect, the information specifying group uplink beacon comprise an information specifying either one single uplink beacon associated with the group or a set of uplink beacons, one per UE, associated with the group. Hereby, a single uplink beacon can be assigned to represent many UEs or a number of uplink beacons can be used whereby the UEs are enabled to rotate to send the group uplink beacon.

In accordance with a second implementation of the first aspect, the network node is configured to send the uplink beacon reconfiguration to each UE of the group. Hereby, a direct signaling of the uplink beacon configuration to all UEs of the group can be provided.

In accordance with a third implementation of the first aspect, the uplink beacon reconfiguration sent to the second UE also comprises a control signal to control the second UE to stop transmitting uplink beacons and to start receiving group uplink beacons from the first UE. Hereby an explicit signaling that enables the second UE to stop sending uplink beacons is achieved.

In accordance with a fourth implementation of the first aspect, the uplink beacon reconfiguration also comprises a scheduling information indicating each of said UEs within the group to act as a UE for sending group uplink beacon or as a UE for receiving group uplink beacons. Hereby, it is made possible for the UEs of the group to alternate in sending a group uplink beacon.

In accordance with a fifth implementation of the first aspect, the network node is further configured to send to the second UE an uplink beacon reconfiguration relating to the first UE. Hereby, the second UE can be updated with information related to uplink reconfigurations in the group.

In accordance with a sixth implementation of the first aspect, the network node is further configured to send to the first UE an uplink beacon reconfiguration relating to the second UE. Hereby, the first UE can be updated with information related to uplink reconfigurations in the group.

In accordance with a seventh implementation of the first aspect, the network node is configured to determine the location of the second UE based on the group uplink beacon received from the first UE. Hereby positioning of the second UE can be performed without receiving an uplink beacon from the second UE.

In accordance with an eighth implementation of the first aspect, the uplink beacon reconfiguration also comprises a first threshold value, said first threshold value determining a signal level of a received group uplink beacon in a UE when the UE is to leave the group. Hereby, a UE can be informed of when to leave a group.

In accordance with a ninth implementation of the first aspect, the network node is configured to receive a first threshold value signal from a UE that the first threshold value is reached and further configured to send new uplink beacon information to the UE in response to receiving the first threshold value signal from the UE. Hereby, when a UE signals to leave a group the network can send new uplink beacon information to the UE for the UE to use when leaving the group.

In accordance with a tenth implementation of the first aspect, the uplink beacon reconfiguration also comprises a second threshold value to determine a signal level of a received group uplink beacon in a UE when the UE is to start sending a complementary uplink beacon back to the network node. Hereby, a mechanism whereby a UE that is close to leaving the group is enabled to signal to the network that the UE is close to leaving the group.

In accordance with an eleventh implementation of the first aspect, the network node is configured to receive a second threshold value signal from a UE that the second threshold value is reached and further configured to send complementary uplink beacon information to the UE in response to receiving the second threshold value signal from the UE. Hereby, the network can send information to the UE that the UE can use when starting to leave a group whereby the UE can leave the group more smoothly.

In accordance with a twelfth implementation of the first aspect, the network node is configured to send the uplink beacon reconfiguration to another UE being determined to be grouped with the group. Hereby, additional UEs can be grouped in the group.

In accordance with a second aspect, a User equipment, UE, comprising a transceiver, where the UE being adapted to send uplink beacons is provided. The UE is configured to send an at least one uplink beacon to a network node and receive an uplink beacon reconfiguration. Hereby, the UE can receive information enabling grouping of UEs into uplink beacon groups, which in turn makes it possible to send fewer uplink beacons from a group of UEs.

In accordance with a first implementation of the second aspect, the UE is configured to, based on the uplink beacon reconfiguration to start receiving group uplink beacons from another UE and to stop sending uplink beacons, based on the reception of said uplink beacon reconfiguration relating to said another UE. Hereby, the own UE is enabled to stop sending uplink beacons and rely on another UEs uplink beacons.

In accordance with a second implementation of the second aspect, the UE is configured to, based on the uplink beacon reconfiguration, send a group uplink beacon. Hereby, other UEs grouped with the own UE can stop sending uplink beacons and rely on the group uplink beacon.

In accordance with a third implementation of the second aspect, the uplink beacon reconfiguration also comprises a control signal and the UE is configured to stop transmitting uplink beacons and to start receiving group uplink beacons from the another UE based on the control signal. Hereby, an explicit control of the uplink beacon transmission can be achieved.

In accordance with a fourth implementation of the second aspect, the uplink beacon reconfiguration also comprises a first threshold value, and where the UE is configured to resume sending uplink beacons when the signal level of the received group uplink beacon from the another UE is below said first threshold value. Hereby, the UE can resume sending an individual uplink beacon when leaving the group.

In accordance with a fifth implementation of the second aspect, the UE is configured to send a signal to a network node when the signal level of the received group uplink beacon is below said first threshold value and further configured to receive from the network node new uplink beacon information. Hereby, the UE can signal to the network when the UE is about to leave the group and can then receive new uplink beacon information from the network, whereby when leaving the group, the UE can start sending a new, individual, uplink beacon.

In accordance with a sixth implementation of the second aspect, the uplink beacon reconfiguration also comprises a second threshold value, and where the UE is configured to start sending a complementary uplink beacon when the signal level of the received group uplink beacon is below said second threshold value. Hereby, the UE can signal to the network when the UE is close to leaving the group.

In accordance with a seventh implementation of the second aspect, the UE is configured to send a signal to a network node when the signal level of the received group uplink beacon is below said second threshold value and further configured to receive from the network node information specifying a complementary uplink beacon. Hereby, the when the UE signals that the UE is close to leave the group it can receive new information from the network that can enable a smooth leaving of the group.

BRIEF DESCRIPTION OF DRAWINGS

The invention will now be described in more detail, by way of example, and with reference to the accompanying drawings, in which.

DESCRIPTION OF EMBODIMENTS

Figure 1:
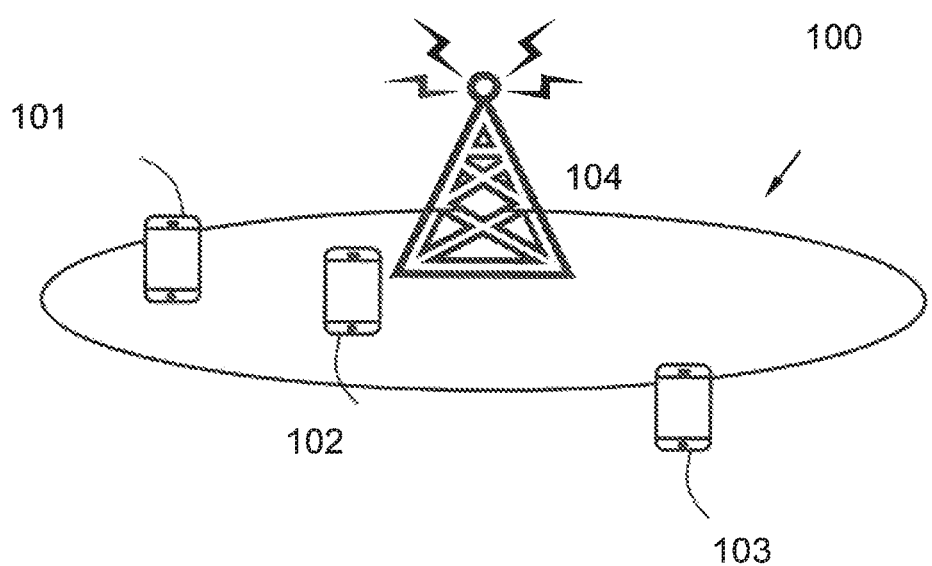
FIG. 1 shows a wireless communication system.

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In Long-Term Evolution (LTE) a Sounding Reference Signal (SRS) can be used to provide uplink reference signals for mobility purposes. Another solution that has been proposed to effectively perform beaconing, consider a frame structure with sub-millisecond subframe time-lengths in a Time Division Duplex (TDD) operation mode, see P. Kela et al. "A Novel Radio Frame Structure for 5G Dense Outdoor Radio Access Networks", accepted at IEEE 81st Vehicular Technology Conference (VTC2015-Spring), May 2015. Time Division Duplex (TDD) is then adopted to exploit, among others, channel reciprocity and flexible DL/UL band allocation. The frame structure accommodates uplink beacon resources that will constitute the basis of mobility and user tracking. The UL beacons are divided into narrowband and wideband beacons. Narrowband beacons enable the network to keep track of the user when no data transmission is active whereas wideband beacons provide channel state information (CSI) for an efficient use of radio resources during data transmission. A key enabler towards UDN mobility are uplink mobility reference signals, termed uplink (UL) beacons herein, based on which the network can locate and track mobile users. Based on the received UL beacons, possibly by several ANs, the network can make intelligent decisions on which AN shall serve this user and possibly predict the location of such user in the near future.

Narrowband beacons can, for example, be transmitted during one symbol at the beginning of each sub-frame spanning the entire frequency range. They are termed "narrowband" since beacon elements (BE), defined as a single subcarrier-symbol pair, can be scheduled to different users for transmission.

Hence, a problem is then how to schedule the finite beacon resources to different users in a non-interfering way. Possible solutions may be sought in time, frequency, code, space and power domains. One solution is to perform time-frequency scheduling of BEs by a central controller. In the code domain, a solution can be exploited either by using semi-orthogonal or sparse codes or signature sequences with good cross-correlation properties (e.g. Zadoff-Chu sequences).

Beaconing grants can be scheduled to users in a semi-persistent way, bearing in mind that different types of users will require different beaconing patterns according to their speed, required reliability, location, etc. In addition to scheduled BE, there is also the possibility that the users decide to transmit a beacon (or beacon request) proactively over some predefined BEs as in a random access channel (RACH). Beacon power transmission will also play a role since it affects both the reliability at which the ANs receive and make use of the beacon, but also on the interference level created to other users transmitting beacons over the same resource. In UDNs, the power can be kept low due to short range and typically line-of-sight (LoS) channel conditions.

Narrowband beacons are transmitted relatively infrequently (e.g. once per second) and allow the network to know which AN can be used for reaching a given user at any given moment. A narrowband beacon can replace current paging mechanisms.

If uplink reference signals for mobility purposes are to be used, the applicability of SRS in LTE seems limited. Indeed, SRS periodicity transmission in LTE is restricted to the set {2, 5, 10, 20, 40, 80, 160, 320} ms, and any change of the periodicity has to be done via Radio Resource Control (RRC) messages. Managing mobility in dense small cell networks is expected to require more flexibility in allocating UL beacon resources, especially in cases where UE density is high.

Further, with the use of UL beacons, the UE can determine on its own the amount of UL beacons it should transmit, i.e. the UL beacon frequency. In this way, it is possible to make sure that a UE only transmits UL beacons on a need basis thus enhancing the overall beacon capacity by allowing more UEs to transmit UL beacons. In addition, UE battery consumption can be optimized if UEs transmit only when needed.

Due to the finite amount of narrowband beacon resources and the expected high user density, it is desired to provide enough narrowband beaconing capacity in order to locate a user in the network without the use of paging. It is possible to define the downlink (DL) packet reachability for a particular user as the incurred delay between a packet arrival to the network and the successful notification to the user through the DL control channel.

This delay will depend on, among others:
  The user density: since increasing the user density means that beacon resources need to be time-frequency shared among more users thus decreasing the beaconing rate. If a user transmits beacons less often, the network will have aged location information and consequently may transmit over an Access Node (AN), which is no longer in the transmission range of the user.
  The user speed: increasing speeds imply that users move-out of the transmission range on ANs which had previously received beacons.
  The Discontinuous Reception (DRX) configuration (tradeoff between power consumption and delay) and others.

Other parameters are related to dimensioning and use of the DL control channel for conveying DL packets to different users in a non-interfering way.

The UDN frame structure in the above article by P. Kela et al. enable enough capacity for CSI beaconing to make resource scheduling efficient for coordinated beam-forming CoMP (Coordinated Multi-Point). Hence, to minimize CSI latency, the UDN concept relies heavily on CSI beacons sent by the users and also on the reciprocity of the Time Division Duplex (TDD) channel. To understand the importance of minimal CSI latency, the performance of the proposed UDN concept has been studied considering different enforced minimum CSI latencies. That is, the model assumes instantaneous CSI availability at the AN but its use is delayed by a known quantity.

FIG. 1 schematically shows a wireless communication system 100. The system 100 comprises a number of UEs 101, 102, and 103 that can communicate to a control plane (CP) network node 104. Here denoted network node 104. The system 100 in FIG. 1 is configurable to allow for transmission of UL beacons by the UEs.

In such a system 100 an effective way to allocate UL beacon resources is to assign the same UL beacon resources to a group of users with similar behavior, and allowing the UL beacon transmission of a single UE (or, more general, a radio node) to be representative of all UEs within the group.

The UL beacon resources can be defined in terms of power, time, frequency, and code sequences. The network node 104 is configurable to schedule each UE to transmit at a certain time occasion on a certain frequency resource block (RB) (with a given bandwidth) with a certain power and with a unique sequence. The transmit power range, number of time beacon opportunities within a radio (sub) frame, the frequency range within the available spectrum and the number of code sequences determine the maximum number of users that can transmit UL beacons within a given radio (sub)frame. Hence, it is important make an efficient use of these limited resources.

Figure 2:
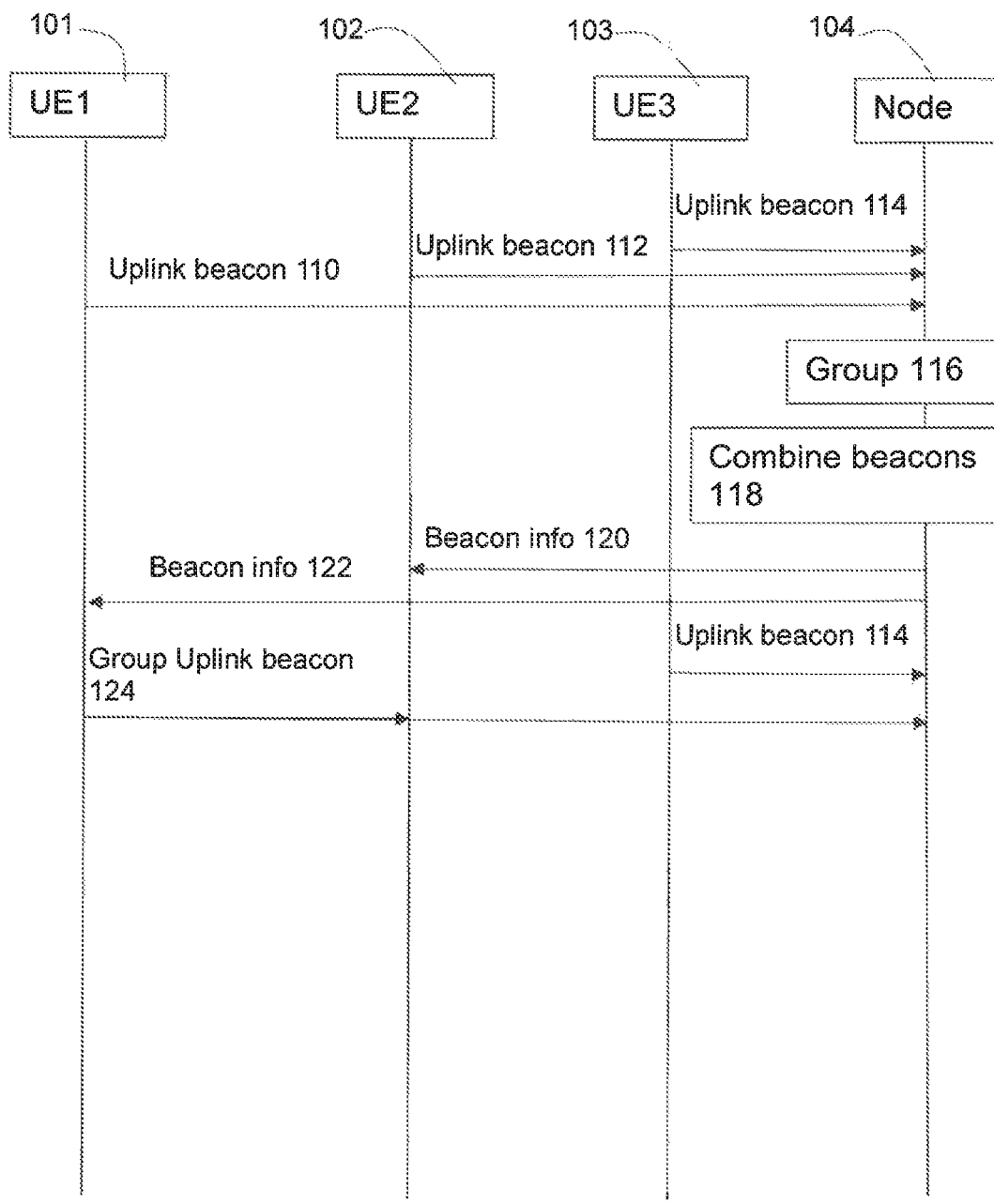
FIG. 2 shows a signaling diagram illustrating forming of a group for UL beacon transmission.

In FIG. 2, a signaling diagram is depicted illustrating signaling between a network node 104 and UEs 101, 102, and 103, to enable efficient use of radio resources for UL beacon transmission. The network node 104 receives uplink beacons 110, 112, 114 from each of the UEs 101, 102, and 103. Based on the received uplink beacons the network nodes decides to group some of the UEs in a step 116. In the scenario described here the UEs 101 and 102 are grouped by the network node 104. How the decision can be made is described in more detail below. When two or more UEs are grouped, the network node 104 determines a group beacon to be used as an uplink beacon representing all of the UEs of the group in a step 118. Information of the group uplink beacon is then sent to the UEs of the formed group (here UE 101 and 102) in messages 120 and 122. In response to the group uplink beacon information the beacon signaling from the UEs of the group can be reduced. In this scenario, the UE 102 stops transmitting uplink beacons and the UE 101 transmits a group uplink beacon 124 also representing the UE 102. This will save radio resources in the system 100. Other ways of implementing the group uplink beacon exist as will be described below.

In Step 116 the network node can base the grouping on different observed parameters. For example, UEs that are co-located and moving together can be grouped. The co-location can be determined by observing the individual UL beacon transmissions and applying positioning, grouping or other correlation methods.

The network node can further manage the group by adding and removing UEs as they move together with the group or move out in a different direction.

The UE group can in accordance with some embodiments be defined in terms of (i) a central position that would correspond to the centroid position of the UE group, and (ii) a set of zones around the centroid defined by different radius. The radii defining the different zones could be based on radio geometry, e.g., different thresholds of signal received power in dB, or Euclidean geometry, e.g., different distance thresholds in meters, or a combination thereof. For example, three major overlapping and concentric zones can be used, here referred to as Type-0, Type-1 and Type-2 with the following meaning:

Type-0 comprises the UEs that are configured to transmit UL beacons according to the configuration of the UE group. These UL beacons may include group UL beacons; Type-0 zone characterizes UEs that belong to the core of the user group.

Type-1 comprises the UEs that are configured to both transmit UL beacons according to the configuration of the UE group e.g. group UL beacons and to a uniquely assigned UL beacon configuration as determined by the network node. This can be a type of individual UL beacon that can be referred to as complementary beacons. Type-1 zone characterizes UEs that belong to the user group but are moving out/in to the user group.

Type-2 comprises the UEs that have been assigned a unique set of UL beacon resources (individual UL beacons). Type-2 zone characterizes UEs that have no UE group. Other configurations are possible such as 2 or 4 zones.

Figure 3:
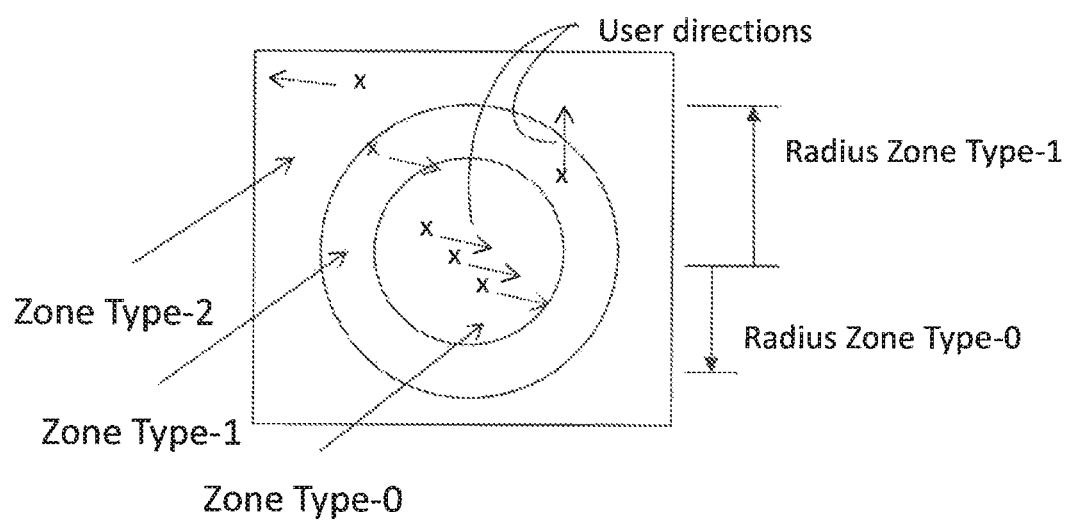
FIG. 3 illustrates a setup of different zones for UL beacon transmission.

FIG. 3 illustrates a possible zone set-up of the different zone types. Note that in this example zone type-2 has no outer boundaries as it comprises the complementary area of zone type-0 and type-1. The radii of each zone type may differ depending on the power of the received signal at the UE/beacon proxy, the sensitivity of the receiver, and the relative movement of the UEs in terms of direction and speed. In addition, a division of the zone types in two categories corresponding to zone Type-0 and zone Type-2 (referred to as type-0/2), or zone Type-1 and zone Type-2 (referred to as type-1/2) are possible options. As compared to a three zone division, where a UEs UL beacons could be fully belonging to a user group (zone type-0), partially belonging to a user group (zone type-1) and not belonging to a user group (zone type-2), a two zone division according zone type-0/2 allows UEs to transmit either UL beacons that only belong to the user group (as in zone-type-0) or individual UL beacons (zone type-2). While a two zone division according zone type-1/2 allows UEs UL beacons to either partially belong to a user group, along with UEs complementary UL beacons (zone type-1), or individual UL beacons that do not belong to the user group (zone type-2).

The UE group is used to reconfigure the UL beacons so that only one UE at any time needs to send beacons on behalf of all the UEs in the group (i.e. group UL beacons). In the context as set out herein, the UE sending the group UL beacons on behalf of all the UEs in the group is referred to as the beacon proxy.

Different UL beacon transmission configuration options for the transmission of beacons can be implemented: For example:

The group UL beacons are sent by only one single UE that undertakes the role of beacon proxy, as determined by the network node.

The UEs in the group alternate in sending the group UL beacons according to a rotation scheme/pattern. The scheme pattern can be predetermined or determined by the network node.

The configuration options can for example be signaled as information in the messages 120, 122.

In addition, the resources allocated for the group UL beacons sent by the UE acting as the beacon proxy may be defined, in frequency-domain, time-domain, power-domain and code-domain, by signaling information describing:

An indication on a unique frequency Resource Block (RB) (with a given bandwidth), or a frequency RB hopping pattern, to be used for the beacons in the group, An indication on the location of time occasions for UL beacons, given by a time period, a time offset with respect to some known time-basis (e.g. start of a frame, start of a subframe, etc.), a time slot number, etc., An indication on the power to be used for the UL beacons, given by an absolute power value, a relative power offset, etc. and An indication on a non-empty set of code sequences to be used for the UL beacons comprising either of a set consisting of one code sequence for the group also referred to as group code sequence.

a set consisting of the code sequences of all UEs comprising the group.

By combining the above options, the entity (such as a UE 101) acting as beacon proxy for other entities can be configured according the following options as determined by the network node:

Single beacon proxy: The beacon proxy role falls on a single UE that transmits group UL beacons on a certain frequency RB, time occasion, power level and code sequence corresponding to a group code sequence. An advantage is then that it enables code sequence savings and power savings, for instance if the UE with the highest battery level is chosen as the beacon proxy.

transmits group UL beacons on a certain frequency RB, time period, power level and alternating code sequences each uniquely identifying a UE within the group. An advantage is then that it enables power savings by having only one UE to transmit the UL beacon.

Rotating beacon proxy: The UEs in the group take turns to act as beacon proxies according to the rotating scheme determined by the network node. The UE assuming the beacon proxy role will transmit group UL beacons on a certain frequency RB, time period, power level and code sequence corresponding to group code sequence. An advantage is then that it enables both code sequence savings and power savings, while it allows tracking each individual UE (as UEs are identified by the order they are expected to send the beacons).

transmit group UL beacons on a certain frequency RB, time period, power level and its own code sequences that uniquely identifies the UE itself. An advantage is then that it enables power savings, while it allows tracking of each individual UE (as the group is identified by the power, the frequency and the time period).

In any of the above configuration options, other UEs in the group can be configured with synchronized Discontinuous Reception (DRX) so that the group UEs can receive the group UL beacons and determine to still be co-located with the group. For this purpose, the group UEs can be configured with information about which beacon resources are used for the group. The group UEs can be also configured, for example by the network, to signal to the network node when the group UL beacon received signal from the beacon proxy is below or above at least two certain threshold values indicating the positioning of the UE in zones of Type-0, Type-1 or Type-2. A UE among the other UEs may also signal when it does not receive any group UL beacons by the beacon proxy.

To enable grouping of suitable UEs to form a group different methods can be used. For example, a user tracking (mobility management) function(s) in the network can be configured to detect that a potential group exists by comparing the positions of UEs. In one embodiment, the network creates a group context (i.e. a data structure) that contains information about which UEs belong to the group. The group context is kept by a control plane (CP) function/mobility management function that may reside in a control node or an access node. The UEs are identified by a suitable identifier, e.g. TMSI (temporary mobile subscriber identity), RNTI (radio network temporary identifier) or other similar identifiers. The group context may also contain information about how the UL tracking transmissions are configured for the group, e.g. the interval between beacon transmissions, the reference signals used for UL beacons, the schedule of beacon transmissions for individual UEs in the group. The group context may also contain information about the tracking requirements for the UEs in the group, e.g. how fast a DL transmission should be delivered to a UE. This can be used to determine a maximum DRX period, since the DRX period cannot be longer than the latency requirement of the DL data reception. The DRX period can be individually configured for the UEs in the group but all UEs should have DRX active periods that coincide with the UL tracking transmissions. Therefore, the DRX periods for different UEs may be configured as fractions of the UL beacon transmission intervals. Hence, when a UE is added to a group, its DRX period and the absolute timing of the DRX active period is reconfigured accordingly.

The individual UE contexts may contain an identifier of/pointer to the group context when the UE is part of a group.

Figure 4:
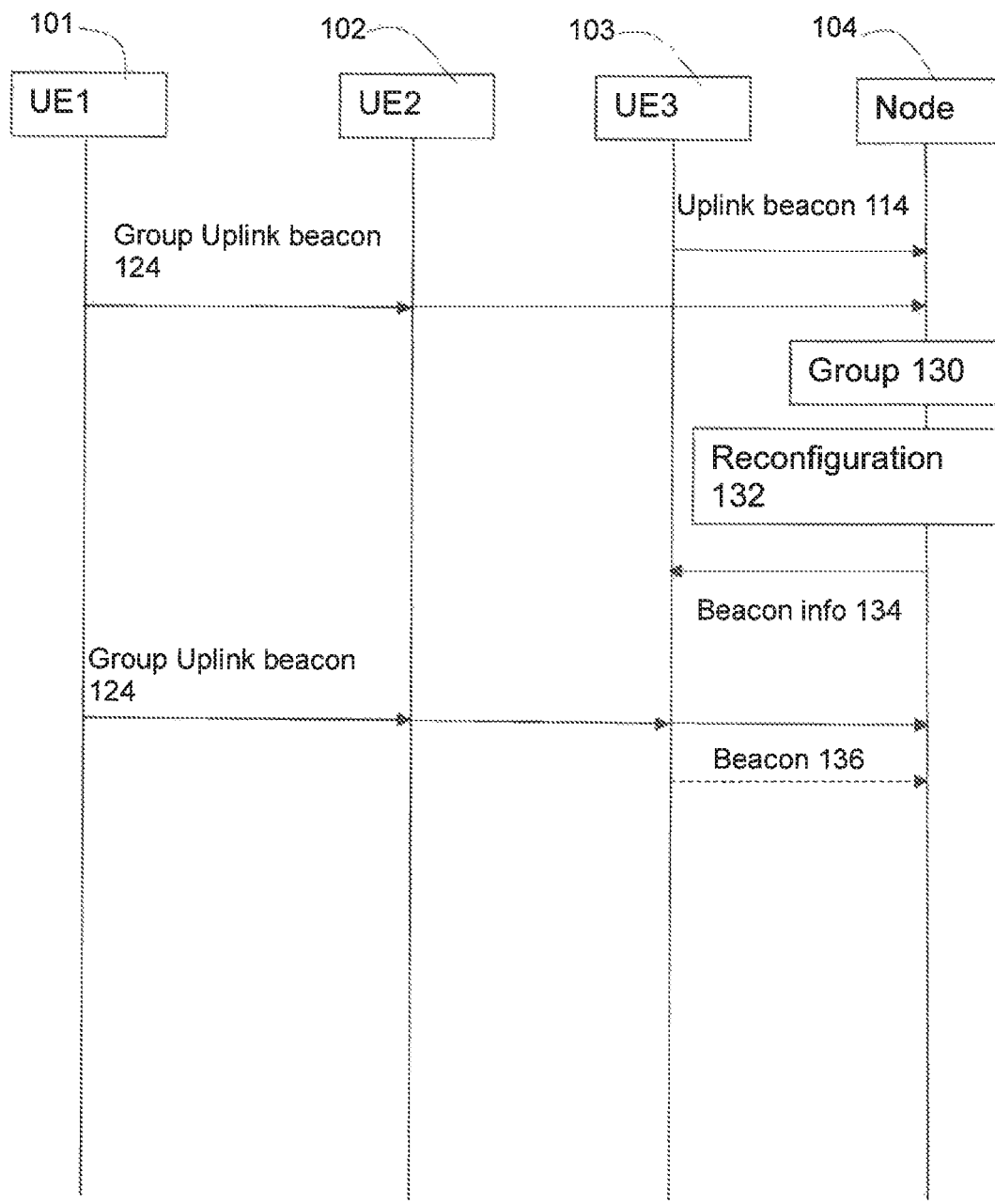
FIG. 4 shows a signaling diagram illustrating adding a UE to a group for UL beacon transmission.

Adding of a UE to a group can be performed in different ways. In one embodiment illustrated in the context of the scenario of FIG. 2 where a group beacon 124 is transmitted for the UEs 101, and 102. The procedure for including one or more UEs into a group can comprise the following steps illustrated in FIG. 4:

a network node 104 detects from individual UL beacon receptions 114 that a UE 103 is moving (or staying co-located) with a group of UEs 101, 102. This can be done in different ways. E.g. a straightforward method would be to determine that the beacons 114 of the UE 103 have been received from similar locations as other UEs 101, 102 within the group for some time, which could be determined by position estimation for the UEs and some UE grouping algorithm. The UE grouping algorithm can be simple and e.g. determine that the estimated distance from the UE group center or the UE group head has been below a threshold for a given number of samples. Distance may be determined based on position and revised based on signal strength updates. Alternatively, implicit triangulation could be used by determining that the patterns of received beacons from different UEs in the group as measured by different receiving Access Nodes (ANs) are similar by some metric. Based on the above, the network node 104 will determine in a step 130 if the UE 103 is to be included in the group. It can also determine if the UE 103 is to be in a particular zone such as zone Type-0 or in zone Type-1 if the system 100 supports a differentiation into zones.

the network node then can perform reconfigurations in a step 132. The reconfiguration is sent to the new UE 103 of the group in a step 134. In response to receiving such a reconfiguration from the network node 104 the UE 103 stops transmitting UL beacons. The UE may retain resource information (including the allocated sequence and as determined by the network) to reuse them in case of transmitting individual UL beacon in the future. In addition, the UE can be configured with the group UL beacon transmission parameters (group UL beacon receiving occasions, group UL beacon transmitting occasions, etc.). Hence, the group uplink beacon 124 will now represent the UEs 101, 102, and 103.

In another embodiment if a UE is in zone Type-1, the UE can be reconfigured according to two different UL beacon transmissions; a group UL beacon transmission 124 where the UEs are part of the group, and another UL beacon where the UE also has an individual UL beacon transmission 136 that can be referred to as a complementary beacon. The complementary UL beacon 136 can then be sent with reduced beaconing rate as compared to a regular individual UL beacon that is sent when the UE is not part of a group.

When adding a new UE 103 to the group the network node 104 can also reconfigure the group UL beacon transmission for the already included UEs 101, 102 in the group. For example, if the rotating beacon proxy scheme is used, a new reconfiguration may be determined according to the new ordering and the new updated set of sequences to be transmitted. This information is then sent to the UEs. The network node can also reconfigure the DRX information for all UEs in the group including the newly included UE 103.

In addition to the above, the network node can signal threshold values to the UEs 101, 102 and 103, which indicate when a UE should report measurements on the group beacon reception to the network node 104. This can be used to determine separation of UEs from the group or transition between different zone types. The threshold values may be associated with the received power signal strength or changes in the received power signal strength. The signaling to the UEs can be sent in separate messages, but can equally will be sent in the reconfiguration messages 120, 122, 134.

Further, the network node 104 can also reconfigure the DL control channel/paging occasions for the UEs, and the configuration for UEs to be able to receive group UL beacons. The UE context is linked to a group context.

For the individual UL beaconing configuration (used in zone Type-1 and zone Type-2), UEs typically try to maintain their assigned sequence configuration but may use fewer resources (especially true when in zone Type-1, where both complementary and group UL beacons will be sent). UEs may also maintain their individual allocated sequences to be used for the group UL beaconing in a rotating proxy beacon scheme.

In a further embodiment, two UE groups could be merged/reconfigured into one. As an example: one group of UEs onboard a bus and a group of pedestrians that gets on the same bus. Both groups could be merged resulting to a group reconfiguration as opposed to UE configuration. The procedure for merging the two groups can then be set to correspond to the above procedure for adding a new UE to an existing group.

Figure 5:
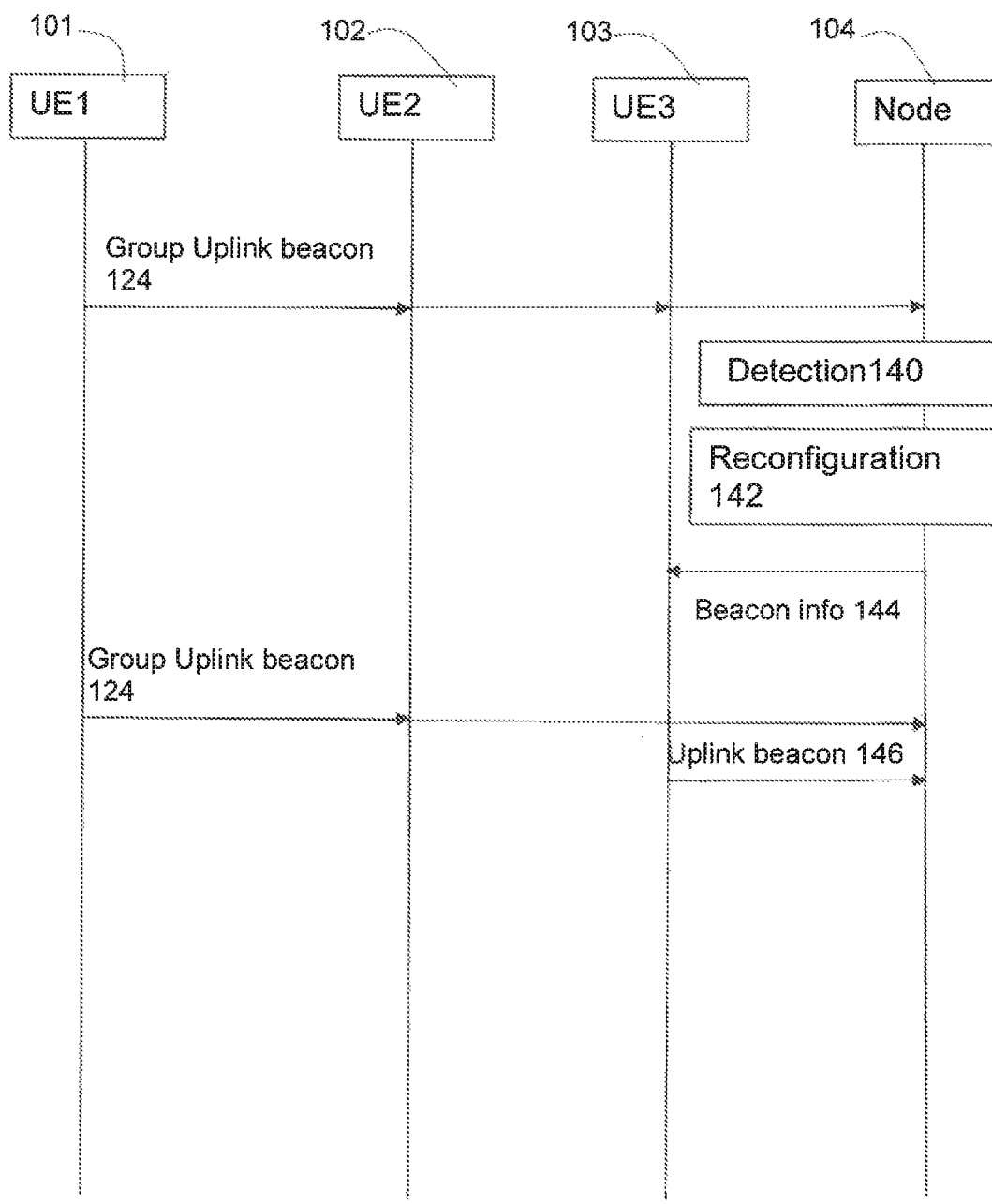
FIG. 5 shows a signaling diagram illustrating removal of a UE from a group for UL beacon transmission.

A UE can also be removed from a group. This can for example be performed as depicted in FIG. 5. The scenario in FIG. 5 is based on the scenario of FIG. 4. The network node determines a need for removal of a UE 103 from the group in a step 140. This can be done in different manners. For example, the network node 104 can detect that the UE 103 has left the group based on the UL beacons or transmissions that are made, i.e. it detects that the position of the UE 103 is no longer the same as the other UEs 101, 102 in the group), or the UE 103 detect that they are no longer part of the group, for example by observing other beacons/transmissions during its DRX wake up time and send non-scheduled beacons or UL control information to the network node 104. The first alternative is particularly feasible for rotating transmission of UL beacons or for zone type 1 and zone type 2 deployments. The network node then reconfigures the UL beacon signaling in a step 142 and sends a reconfiguration message 144 to the UE 103 (and possibly also to the other UEs of the group depending on the reconfiguration performed). The message 144 reconfigures the UE 103. For example, if the UE move from zone Type-1 to zone Type-2 and is configured with individual UL beaconing transmission, then the UE can be reconfigured to continue with individual beaconing transmission with most likely an increased beaconing rate, and the remaining UEs of the group are reconfigured according to the new ordering and the sequences if rotating scheme is used. More specifically, for a rotating scheme where each user in the group transmits its own sequence then (i) the transmission of each user is configured with its sequence (own or group sequence), time-offset (relative to some known beaconing occasion), frequency and power resources to transmit its beacons and (ii) each user's reception is configured with the sequence (group sequence id) or sequences (other users sequence ids) and the time-offsets and frequency resources a user should receive the beacons of the other users in the group. For a non-rotating scheme, when any of the UEs moving from zone Type-1 to zone Type-2 was acting as beacon proxy, then the network node 104 needs to reconfigure another UE in the group to act as new beacon proxy.

In the reconfiguration, the UE context is separated/unlinked from the group context. If a UE 103 move from zone Type-0 to zone Type-1 and is configured with only group UL beacon transmission, the UE can be reconfigured to additionally transmit individual UL beacons with different time frequency resources, as well as new code sequence if the group beaconing is based on a group code sequence.

Furthermore, the UEs who receive, which in the case of mobile radio node is the beacon proxy and in the case of the UE group is the UEs, can report the signal strength of the reception to the network node 104. The reporting can be based on the threshold values as communicated by the network node. The network node 104 can also set the threshold values and can also decides the zones and zone transition hysteresis values. The threshold values can dependent on the deployment of access nodes and transmission/reception beams in the area as well as the velocity and the density of the users. For instance, in case of beamforming the threshold values should guarantee that the group is within the coverage of a transmitter/receiver beam.

In the extreme case where a user quickly moves out from a group without prior assignment of resources for individual UL beacons the following fallback scenarios can be envisaged. In the UE grouping scenario, if the UE has not been assigned UL beacon resources for individual beaconing and receives the group UL beacons below a certain threshold (indicating zone type-2) it can send non-scheduled RACH beacons or UL control information to the network node. In case of mobile radio node, the UE can send non-scheduled beacons or UL control information to the network node 104 when the DL signal from the mobile radio node is below a threshold.

In one embodiment, a UE that detects that it is no longer part of the group can change to a UE controlled mobility (idle/inactive mode) and determine which tracking area it is located in based on broadcasted system information and send a tracking area update to the network.

The reconfiguration of a UE, such as the reconfiguration messages 120, 122,134 and 144 can advantageously be performed by a Radio Resource Control (RRC) reconfiguration procedure/message. Some different embodiments are described below.

In a first reconfiguration embodiment, the network determines one first UE within the group that will be configured to send group UL beacons, hence being labeled as a beacon proxy UE. The beacon proxy is configured with a certain sequence, radio resources and transmission occasion for the group UL beacon transmission. In a second reconfiguration embodiment, the other UEs in the group are configured with a DRX period that coincides with group UL beacon transmissions from the beacon proxy. In this second embodiment, the other UEs in the group would typically also be configured to receive the group UL beacons from the beacon proxy when they are in a receiving period of their DRX cycle. They would therefore be able to autonomously detect that they are still co-located with the beacon proxy. If a UE detects that it is no longer co-located with the group, the UE can then transmit an unscheduled beacon or send a control message to the network to indicate that the network should reconfigure either the group (if it is the beacon proxy that has left) or the UE. Detection of a change in the group co-location may be triggered when a specific number of beacons have not been received, or when the received signal strength of the beacons is below a set threshold. For example, a criterion may be that the average power of the last number N beacons is below a threshold value, or that a number N consecutive beacons have been below a threshold value (where N can be a configurable system parameter).

If the system is configured with a number of zones as described above, a reconfiguration is typically also needed if the UEs move from zone Type-0 to zone Type-1 and are configured with only group UL beacon transmission. The UEs can be reconfigured to additionally transmit individual UL beacons with different time frequency resources, as well as new code sequence if the group beaconing is based on a group code sequence.

In a third embodiment, the UEs of a group other than the beacon proxy may be configured to send occasional individual UL beacons to allow the network to detect if a UE is no longer co-located with the rest of the group. These occasional UL beacons can then typically be less frequent than what would be required if these UEs did not belong to a UE group, so power savings would still be possible.

In forth embodiment, the network is adapted to configure the UEs in the group to transmit in a certain order where the UEs send group UL beacons according to their own sequence and a certain pattern e.g., transmitting UL beacons in turns (e.g., round-robin manner). An advantage of this embodiment is that the energy consumption for the beacon transmissions is equally spread across the UEs within the group. Another advantage is that it is robust when the transmitting UE leaves the group since it is not relying on a single UE for all the transmissions. Also in accordance with the fourth embodiment, the UEs can be configured with coinciding DRX wake up periods. The UEs can then be provided with information to determine that an UL beacon transmission belongs to a UE in the group. In one implementation, the UEs may rely only on vicinity of the transmitting UE as determined by the received signal power of the UL beacon. In another implementation, all the UEs in the group may be configured to transmit the same reference signal/sequence in the group UL beacon. It can then be simple for the UEs to detect that the beacon of the group is being transmitted. In yet another implementation, all the UEs can be provided with information about the beacons used by all the other UEs in the group.

In some embodiments of the single beacon proxy, as set out above, the group management and the beacon configuration of UEs in the group can be implemented in a mobile radio node who will always be acting as beacon proxy. That requires the mobile radio node to get authorization by the network to control the related resources and reconfigure the UEs. Instead of being configured with synchronized DRX, the said other UEs in the group, can alternatively be configured to send their own beacons labelled as inbound beacons, at different frequencies and time periods but at much lower transmit power. The transmit power the UL beacons of the other UEs should be sufficiently low, not to interfere with the group UL beacons of the beacon proxy, i.e., the said mobile radio node, and sufficiently high to be received and decoded by the mobile radio node. The configuration of the other UEs within the group can be performed by either the mobile radio node or the network node. The mobile radio node, that is acting as the beacon proxy, can in some embodiments signal to the network node when a UE's (of the said other UEs) received beacons are below or above at least two certain threshold values indicating positioning of the UE in zones of Type-0, Type-1 or Type-2, or when a change of UEs position is estimated between zone of Type-0, Type-1 and Type-2 around the mobile radio node. It can also signal when a UE's (of the said other UEs) beacons are not received. In addition, the mobile radio node or the network node may configure one or more of the UEs to transmit individual UL beacons, at some specified resources, so that both the mobile radio node and the access node can receive the UL beacons from the UE.

Thus, in some system configurations, the first UE 101 acting as beacon proxy, and which can be configured to send UL beacons on behalf of the other UEs within the group, is a mobile radio node (RNd) that has Access Node (AN) capability and is mounted in a vehicle such as bus, a car or any transportation vehicle. As the vehicle moves, the RNd contacts the network by sending a message requesting to act/register as an AN. The RNd may contact the network either via an AN as a UE or via a backhaul node as an external AN. Upon registration and authorization confirmation the RNd operates as a Beacon proxy Access Node (BAN). Thus, in such a configuration the UE 101 will act as a BAN.

Operating in BAN mode implies that towards the UEs the RNd acts as an ordinary AN with respect to UL beacons, while towards other ANs the RNd may act as either a beacon proxy UE or, as in a further embodiment, as a neighboring AN to all ANs in its proximity. This latter also implies UL beacon scheduling information between the BAN and the network node controlling the ANs in BANs proximity. The information aims at addressing potential interference between beacons within the group and the group UL beacons. It also includes information about the reception of the UE signal with regards to the signal thresholds set in the control plane, the aim of which is to capture the movement of a UE between different zone types.

In the control plane, acting as an AN, the BAN schedules the UL beacons of the UEs inside the bus (or the vehicle) according to the scheduling decision of the network node. The AN associates the UEs with the UL beacons of the BAN and stores this information locally. An advantage is then that frequency and time resources for UL beacon sequences and transmissions can be spatially reused within the vehicle assuming that the UL beacons are transmitted in the UL with lower transmit power than regular beacons, i.e. via regular outdoor ANs.

When a group of UEs move from the coverage of one AN, the whole group can be handed over jointly. The group context, and usually also the UE contexts, are sent from the source AN to the target AN. In one embodiment, the contexts will be sent in a handover request. The handover request may be sent over a direct logical interface between the ANs (analogous to an X2 interface) or via a control plane entity. In many cases, it will be possible to perform the handover without any RRC reconfiguration of the UE group, by keeping the same resources for DL signaling and UL beaconing for the UEs in the group. For UEs without active data transmissions it can also be avoided to reconfigure individual user plane paths for the UEs in the group. However, in some embodiments the UEs in the group can be provided with an RRC reconfiguration message. The RRC reconfiguration messages for a group may either be sent individually to each UE over a unicast RRC channel, or it may be transmitted over a multicast channel and received simultaneously by all the UEs in the group. The latter alternative requires that RRC messages can be transported over a multicast channel/bearer, and if the RRC message is encrypted a common key for the UEs in the group need to be used.

Figure 6:
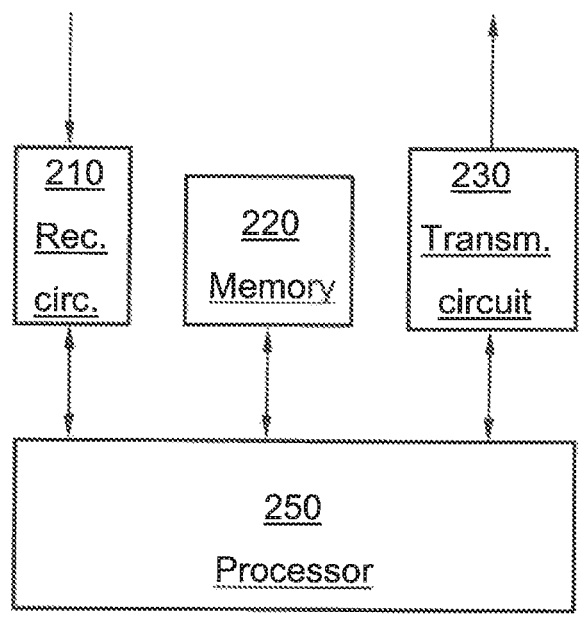
FIG. 6 shows a UE.

In FIG. 6, a UE 102 is depicted. The UE 102 comprises transceiver circuitry formed by a receiver 210 and a transmitter 230 for wireless communication with a wireless network. The UE 102 further comprises a processor 240 that can use a memory 220. The processor 240 can perform all the activities of the UE and is operatively connected to the receiver 210 and transmitter 230. The other UEs can be implemented in a corresponding manner as the UE 102.

Figure 7:
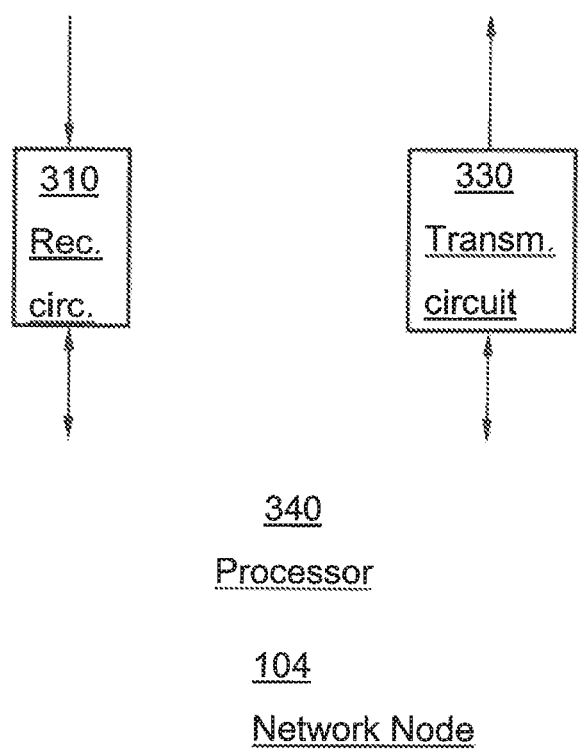
FIG. 7 shows a network node.

In FIG. 7, a network node 104 is depicted. The network node 104 comprises transceiver circuitry formed by a receiver 310 and a transmitter 330 for wireless communication with UEs 101,102, 103. The network node 104 further comprises a processor 340 that can use a memory 320. The processor 340 can perform all the activities of the network node 104 and is operatively connected to the receiver 310 and transmitter 330. The network node 104 can further comprise an input/output unit 350 for communication with other entities in a wireless communication network.

Using the invention as described herein can allow for a more efficient usage of resources (time, frequency, code, power, etc.) devoted to UL beacon transmissions. This can reduce UE transmission energy, support higher number of UEs in an area (enhanced resource reuse) and reduce interference among beacon transmissions. Use of the invention will enable efficient handling of joint mobility for UEs in a group that moves together. This will reduce the signaling related to mobility. The UEs are being tracked by UL beacon transmissions, which can be reconfigured based on a determined grouping of the UEs. The invention can be particularly advantageous for UEs that have infrequent transmissions so that there is no requirement on having accurate channel state information. For such UEs the location tracking is used to keep the UEs reachable for DL transmission/ paging, and to keep the access nodes (AN) the UE may transmit via prepared for receiving UL transmission by providing those ANs with (access to) relevant UE context information.

The invention claimed is:

1. A network node comprising:
a transceiver for communication with plurality of User Equipment, UEs, the network node being configured to:
receive uplink beacons corresponding to the plurality of UEs,
determine a group of the plurality of UEs moving together comprising at least a first UE and a second UE, based on the received uplink beacons from the UEs in the group,
determine an uplink beacon reconfiguration for each UE in the group, comprising:
information specifying a group uplink beacon to be assigned to represent the group of UEs, and
information specifying a UE configuration for the UEs in the group, indicating each UE in the group either as being a UE for sending the group uplink beacon to the network node, or as a UE for receiving the group uplink beacon, while not sending the corresponding uplink beacon, from the UE sending the group uplink beacon.

2. The network node according to claim 1,
wherein the information specifying the group uplink beacon comprises information specifying either one single uplink beacon associated with the group from one of the UEs or a rotation of the uplink beacon, one per UE, from different ones of the UEs associated with the group.

3. The network node according to claim 1,
wherein the network node is configured to send the uplink beacon reconfiguration to each UE in the group.

4. The network node according to claim 2,
wherein the uplink beacon reconfiguration also comprises a scheduling information indicating the rotation of each of the UEs within the group to act as the UE for sending the group uplink beacon to the network node or as a UE for receiving the group uplink beacon from the UE sending the group uplink beacon.

5. The network node according to claim 3,
wherein the uplink beacon reconfiguration also comprises a first threshold value, the first threshold value determining a signal level of the received group uplink beacon in one of the UEs when the one UE is to leave the group.

6. The network node according to claim 5,
wherein the network node is configured to receive a first threshold value signal from the one UE that the first threshold value is reached and further configured to send new uplink beacon information to the one UE in response to receiving the first threshold value signal from the one UE.

7. The network node according to claim 6,
wherein the uplink beacon reconfiguration also comprises a second threshold value to determine a signal level of the received group uplink beacon in the one UE when the UE is to start sending a complementary uplink beacon back to the network node when the one UE is to leave the group.

8. The network node according to claim 1,
wherein the network node is configured to send the uplink beacon reconfiguration to a new UE which is determined to be grouped in the group.

9. A User Equipment, UE, comprising a transceiver, the UE being adapted to send uplink beacons, the UE being configured to:
send the uplink beacons to a network node; and
receive an uplink beacon reconfiguration from the network node when the UE is in a group of UEs moving together also comprising at least one other UE;
the UE being configured to, based upon the uplink beacon configuration,
start receiving a group uplink beacon from another UE in the group and to stop sending the uplink beacons, based on the reception of the uplink beacon reconfiguration relating to the another UE in the group.

10. The UE according to claim 9,
wherein the UE is configured to, based on the uplink beacon reconfiguration, send a group uplink beacon to the network node when the other UEs in the group are not sending the uplink beacons.

11. The UE according to claim 10,
wherein the uplink beacon reconfiguration also comprises a control signal, wherein the UE is configured to stop transmitting the uplink beacons and to start receiving the group uplink beacons from the another UE based on the control signal.

12. The UE according to claim 10,
wherein the uplink beacon reconfiguration also comprises a first threshold value, and where the UE is configured to resume sending the uplink beacons when a signal level of the received group uplink beacon from the another UE is below the first threshold value.

13. The UE according to claim 12,
wherein the UE is configured to send another signal to the network node when the signal level of the received group uplink beacon is below the first threshold value and further configured to receive from the network node new uplink beacon information in response to sending the another signal to the network node.

14. The UE according to claim 13,
wherein the uplink beacon reconfiguration also comprises a second threshold value, wherein the UE is configured to start sending a complementary uplink beacon to the network node when the signal level of the received group uplink beacon is below the second threshold value.

15. A device, comprising:
a memory storing instructions; and
a processor coupled to the memory to execute the instructions to:
receive uplink beacons corresponding to a plurality of User of Equipment, UE,
determine a group of the plurality of UEs moving together comprising at least a first UE and a second UE, based on the received uplink beacons from the UEs in the group,
determine an uplink beacon reconfiguration for each UE in the group, comprising:
information specifying a group uplink beacon to be assigned to represent the group of UEs, and
information specifying a UE configuration for the UEs in the group, indicating each UE in the group either as being a UE for sending the group uplink beacon to the processor, or as a UE for receiving the group uplink beacon, while not sending the corresponding uplink beacon, from the UE sending the group uplink beacon.

16. The device according to claim 15,
wherein the information specifying the group uplink beacon comprises information specifying either one single uplink beacon associated with the group from the one of the UEs or rotation of the group uplink beacon from different ones of the UEs, one per UE, associated with the group.

17. The device according to claim 15,
wherein the device is configured to send the uplink beacon reconfiguration to each UE in the group.

18. The device according to claim 16,
wherein the uplink beacon reconfiguration also comprises a scheduling information indicating the rotation of each of the UEs in the group to act as a UE for sending the group uplink beacon to the device or as a UE for receiving group uplink beacon from the UE sending the group uplink beacon.

19. The device according to claim 17,
wherein the uplink beacon reconfiguration also comprises a first threshold value, the first threshold value determining a signal level of the received group uplink beacon in one of the UEs when the one UE is to leave the group.

\* \* \* \* \*